United States Patent
Degrauwe et al.

(10) Patent No.: US 7,026,924 B2
(45) Date of Patent: Apr. 11, 2006

(54) SYSTEM FOR DETECTING INDIVIDUALS OR OBJECTS PASSING THROUGH AN ENTRANCE-EXIT OF A DEFINED SPACE

(75) Inventors: Marc Degrauwe, Chez-le-Bart (CH); Thierry Roz, Hauts-Geneveys (CH); Olivier Desjeux, Le Landeron (CH)

(73) Assignee: EM Microelectronic - Marin SA, Marin (CH)

( * ) Notice: Subject to any disclaimer, the term of this patent is extended or adjusted under 35 U.S.C. 154(b) by 74 days.

(21) Appl. No.: 10/469,344

(22) PCT Filed: Dec. 19, 2001

(86) PCT No.: PCT/EP01/15079

§ 371 (c)(1),
(2), (4) Date: Aug. 28, 2003

(87) PCT Pub. No.: WO02/071340

PCT Pub. Date: Sep. 12, 2002

(65) Prior Publication Data

US 2004/0070501 A1  Apr. 15, 2004

(30) Foreign Application Priority Data

Mar. 8, 2001  (EP) .................................. 01200876

(51) Int. Cl.
*G08B 23/00* (2006.01)
(52) U.S. Cl. .................. 340/523; 340/573.1; 340/541; 340/686.6; 340/536.23; 340/572.1
(58) Field of Classification Search .. 340/572.1–572.9, 340/573.1, 573.4, 5.42, 5.1, 5.2, 5.8, 5.6–5.67, 340/5.81, 10.1, 10.3, 10.4–10.42, 825.77, 340/825.78; 235/33, 35–45, 384, 491, 380–382.5; 705/17, 13
See application file for complete search history.

(56) References Cited

U.S. PATENT DOCUMENTS

| | | | | |
|---|---|---|---|---|
| 4,302,846 A | * | 11/1981 | Stephen et al. | 455/19 |
| 4,303,910 A | * | 12/1981 | McCann | 340/572.2 |
| 4,459,474 A | * | 7/1984 | Walton | 235/380 |
| 4,595,915 A | * | 6/1986 | Close | 340/572.2 |
| 5,701,127 A | * | 12/1997 | Sharpe | 340/10.2 |

(Continued)

FOREIGN PATENT DOCUMENTS

GB  2 246 896  2/1992

(Continued)

*Primary Examiner*—Benjamin C. Lee
(74) *Attorney, Agent, or Firm*—Sughrue Mion, PLLC

(57) ABSTRACT

There is disclosed a system for detecting the passage of persons or objects through an entry-exit (4) to a delimited space (2), including (i) a detection device including transmission means (8) for transmitting different first and second electromagnetic signals (a, b) in respectively first and second communication regions (A, B) spatially separated from each other and partially overlapping, (ii) portable electronic units (40) intended to be fitted to said persons or objects and including reception means for said first and second electromagnetic signals, and (iii) means for detecting the direction of passage, through said entry-exit, of a person or an object fitted with a portable electronic unit. Each portable electronic unit includes amplitude measuring means for determining the reception amplitude of said first and second electromagnetic signals and comparator means for comparing the reception amplitude of the first and second electromagnetic signals so as to determine which of these two signals has the highest amplitude.

8 Claims, 3 Drawing Sheets

U.S. PATENT DOCUMENTS

| | | | |
|---|---|---|---|
| 5,726,628 A * | 3/1998 | Yoo | 340/551 |
| 5,809,142 A * | 9/1998 | Hurta et al. | 705/68 |
| 6,097,301 A | 8/2000 | Tuttle | |
| 6,396,438 B1 * | 5/2002 | Seal | 342/127 |
| 6,424,838 B1 * | 7/2002 | Stobbe et al. | 455/456.1 |
| 6,501,435 B1 * | 12/2002 | King et al. | 343/795 |
| 6,653,946 B1 * | 11/2003 | Hassett | 340/928 |

FOREIGN PATENT DOCUMENTS

| WO | WO 92 08148 A1 | 5/1992 |
|---|---|---|
| WO | WO 00 67208 A1 | 11/2000 |
| WO | WO 01 03057 A1 | 1/2001 |

* cited by examiner

SYSTEM FOR DETECTING INDIVIDUALS OR OBJECTS PASSING THROUGH AN ENTRANCE-EXIT OF A DEFINED SPACE

BACKGROUND OF THE INVENTION

The invention concerns the detection of persons or objects fitted with portable electronic units, or electronic tickets, particularly including means for receiving electromagnetic signals, these persons or objects being capable of entering or leaving a delimited space, via at least one entry-exit.

The system includes in particular a detection device associated with this delimited space and including electromagnetic signal transmission means.

The present invention concerns more particularly such a passage detection system wherein the transmission means of the detection device associated with the delimited space are arranged to transmit different first and second electromagnetic signals in respectively first and second communication regions separated spatially from each other and partially overlapping each other, these first and second regions each covering an entry-exit zone defined by the entry-exit to the delimited space.

A system for detecting persons or objects having the aforementioned features is disclosed particularly in International Patent Application No. WO 01/03057 also in the name of the Applicant, which is incorporated herein by reference. One could also refer to European Patent Application No. 00204758.8 of 29 Dec. 2000 entitled "Systéme de détection du passage d'un individu ou objet par une entrée-sortie á un espace délimité >> also in the name of the Applicant.

The use of two partially superposed electromagnetic fields advantageously allows detection of the direction of passage, through the entry-exit, of a person or an object fitted with a portable electronic unit. For this purpose, there are provided, within the scope of the present invention, means for detecting the direction of passage of a person or an object as a function of the reception, by the electronic unit, of first and second electromagnetic signals respectively transmitted in the first and second communication regions.

FIG. 1 schematically illustrates an implementation example of an aforementioned detection system. Persons or objects are capable of entering or leaving a delimited space 2 (for example a means of public transport such as a passenger carriage or bus) through at least one entry-exit, indicated by the reference 4. As already mentioned, a detection device is associated with delimited space 2 and includes, in particular, transmission means 8. These transmission means 8 include an electronic circuit 10 connected to a pair of antennae 12, 13 arranged at entry-exit 4. Antennae 12, 13 transmit respectively, preferably at a relatively low frequency (of the order of a hundred kHz), a first and a second electromagnetic signal, designated "a" and "b" in the following description, in respectively first and second communication regions A and B shown schematically in FIG. 1. These communication regions A and B cover an entry-exit zone 32 to delimited space 2 defined by entry-exit 4.

Communication regions A and B are at least partially separated from each other and have a common zone or overlapping zone indicated by the hatched zone AB. In practice, this overlapping zone AB can be significant in terms of surface area and, in particular, be larger than the non-superposed regions of the two communication zones A, B. When a person or an object fitted with a portable electronic unit, designated 40 in FIG. 1, passes through entry-exit 4, as schematically illustrated by arrow 34, or passes into zone 32, the portable electronic unit thus successively penetrates into and/or the other of communication regions A, B. Portable electronic unit 40 with which each person or object is fitted, thus picks up a succession of the first and second electromagnetic signals "a" and "b" transmitted by antenna 12, 13. The order and succession of electromagnetic signals received by portable electronic unit 40 allows the direction of passage of the person or object through entry-exit 4 to be identified.

The robustness of this detection of the direction of passage is greatly dependent upon the extent of overlapping zone AB between the two communication regions A, B. Inside this overlapping zone AB, electronic unit 40 receives both the first electromagnetic signal "a" and the second electromagnetic signal "b" respectively transmitted by antennae 12 and 13. The direction of passage of electronic unit 40 in overlapping zone AB cannot therefore be determined based solely on identification of the received electromagnetic signals. Taking account of the real spatial arrangement of communication regions A, B and/or the speed of movement of electronic unit 40 through entry-exit 4, there is a relatively high probability that the portable electronic unit will be directly or too quickly in overlapping zone AB, such that the actual direction of passage of portable electronic unit 40 cannot be properly detected.

SUMMARY OF THE INVENTION

It is thus an object of the present invention to improve the robustness of detection of the direction of passage of the aforementioned system and particularly to allow reliable detection of said direction of passage, even when the portable electronic unit rapidly enters the overlapping zone of two communication regions.

The present invention thus concerns a system which detects the passage of persons or objects and whose features are recited in the claims.

The present invention also concerns a portable electronic unit whose features are recited in the claims.

Advantageous embodiments of the present invention form the subject of the dependent claims.

According to the invention, each portable electronic unit is thus fitted with amplitude measuring means for determining the amplitude of the electromagnetic signals received by this portable electronic unit. Each portable electronic unit further includes comparison means for comparing the amplitude of the first electromagnetic signal transmitted in the first communication region with the amplitude of the second electromagnetic signal transmitted in the second communication region in order to determine which of these electromagnetic signals has the highest amplitude.

Consequently, each portable electronic unit is capable of deriving additional data, namely the amplitude of the received signals, allowing it to detect the actual direction of passage of the unit through the entry-exit. The signals transmitted in the overlapping zone can thus actually be used for determining this direction of passage.

Other features and advantages of the present invention will appear more clearly upon reading the following detailed description, made with reference to the annexed drawings, given by way of non-limiting example in which:

DETAILED DESCRIPTION OF THE INVENTION

Figure 1:
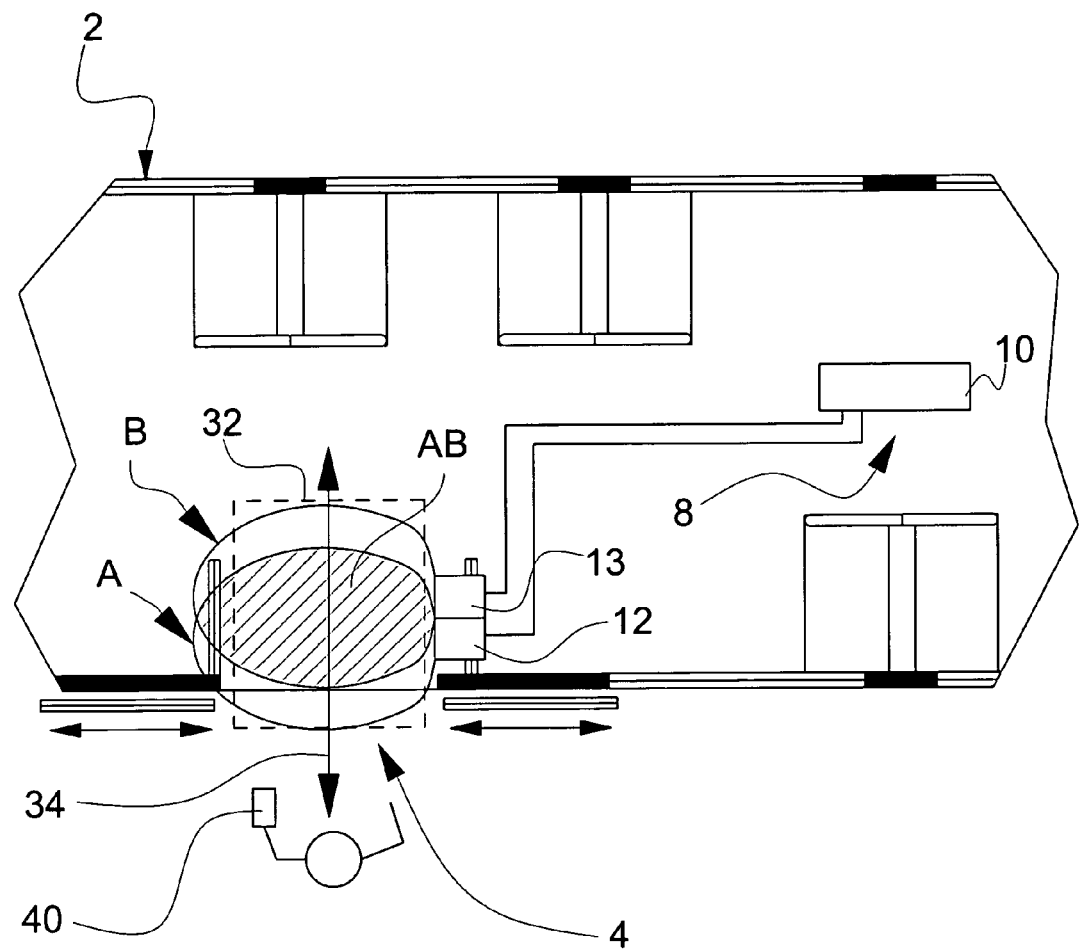
FIG. 1, already presented, is a schematic illustration of a system for detecting the direction of passage forming the subject of the present invention.
Figure 2:
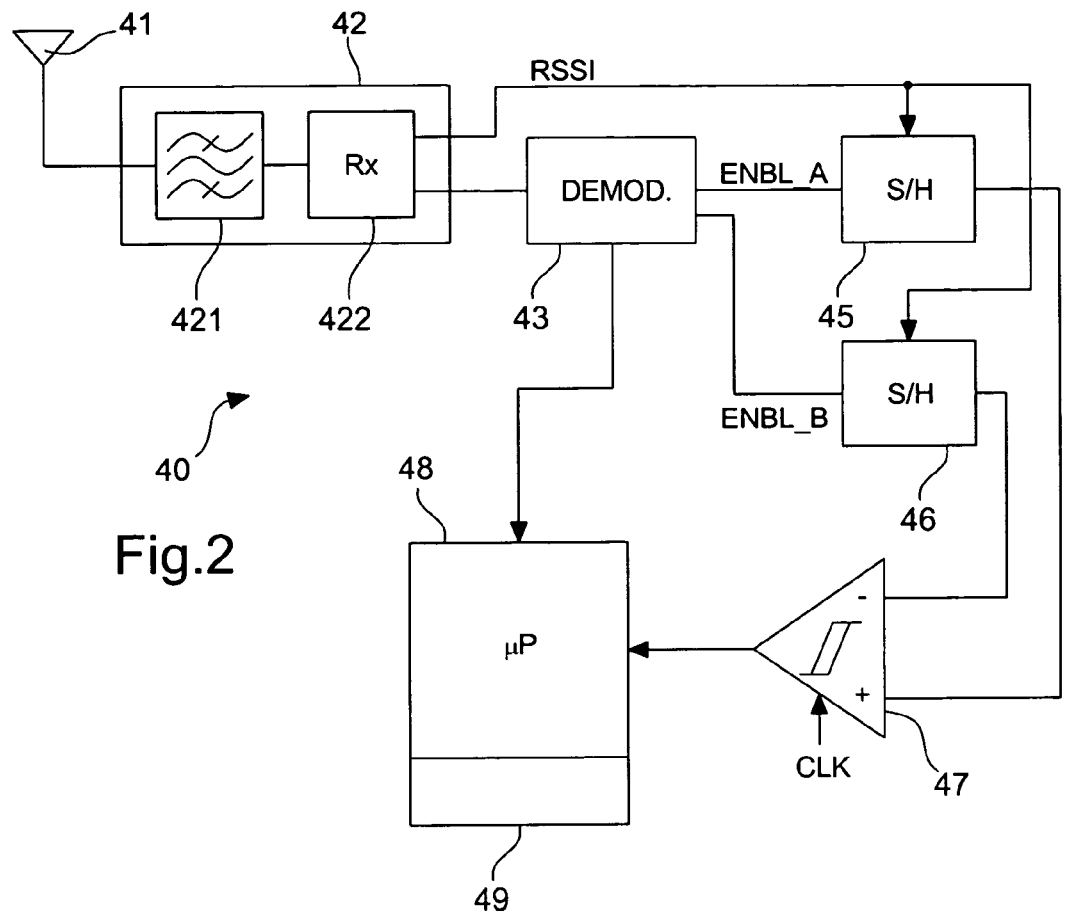
FIG. 2 shows a first variant of a portable electronic unit according to the invention.

FIG. 2 shows a first variant of a portable electronic unit according to the invention. According to this first variant, the first and second electromagnetic signals "a" and "b" are transmitted at the same frequency by antenna 12 and 13 and are multiplexed over time, i.e. alternately transmitted, periodically, as illustrated schematically in FIG. 3. In this case, the first and second electromagnetic signals "a" and "b" differ in the data that they carry.

As illustrated in FIG. 2, each portable electronic unit includes a single reception channel for receiving first and second electromagnetic signals "a" and "b". This electronic unit 40 thus includes an antenna 41 connected to reception means 42 including the series arrangement of a pass-band filter 421 tuned to the transmission frequency of the first and second electromagnetic signals and a receiver circuit 422 delivering at output a reception signal carrying the transmitted data. This reception signal is delivered to decoding means, or demodulator 43, for extracting the useful data, particularly the data identifying the received electromagnetic signal, namely an identifier of the first "a" or second "b" electromagnetic signal. The decoded data is transmitted to a central processing unit 48, comprising a microprocessor or microcontroller, associated with a memory 49. Receiver circuit 422 also typically delivers a signal indicating the received signal reception amplitude, indicated in the Figure by the reference RSSI ("Received Signal Strength Indication").

Portable electronic unit 40 further includes two sample-and-hold circuits, respectively indicated by the references 45 and 46, each for sampling the reception signal and providing an amplitude measurement thereof. These sample-and-hold circuits 45, 46 are for providing respectively an amplitude measurement of the first and second signals alternately received by electronic unit 40 and they consequently receive the received signal strength indication RSSI delivered at the output of receiver circuit 422.

Sample-and-hold circuits 45, 46 are respectively enabled by logic control signals ENBL_A and ENBL_B delivered at the output of decoding means 43. These control signals ENBL_A and ENBL_B are representative of the type of signal received, namely the first signal "a" or the second signal "b", and are derived from the identifier contained in such signal. In particular, and by convention, it will be assumed that the control signal ENBL_A takes the "high" logic state when electronic unit 40 receives the first electromagnetic signal <<a>>, and the "low" logic state in the opposite case. Conversely, control signal ENBL_B takes the "high" logic state when second electromagnetic signal "b" is received and the "low" logic state in the opposite case.

In addition to the fact that sample-and-hold circuits 45, 46 respectively allow reception amplitude measurements of the first and second electromagnetic signals "a" and "b", each sample-and-hold circuit is arranged to hold this amplitude measurement for a sufficiently long period of time to allow comparison with the amplitude measurement produced by the other sample-and-hold circuit.

Each sample-and-hold circuit 45, 46 delivers a signal representative of the measured reception amplitude to a comparator circuit 47 which, at output, provides a signal indicating which of received signals "a" and "b" has the highest amplitude. This comparator circuit 47 is clocked by a suitable clock signal CLK so as to carry out a periodic comparison of the amplitude measurements of the first and second electromagnetic signals. This clock signal CLK is preferably derived, in a known manner, from the received electromagnetic signal frequency.

Figure 3:
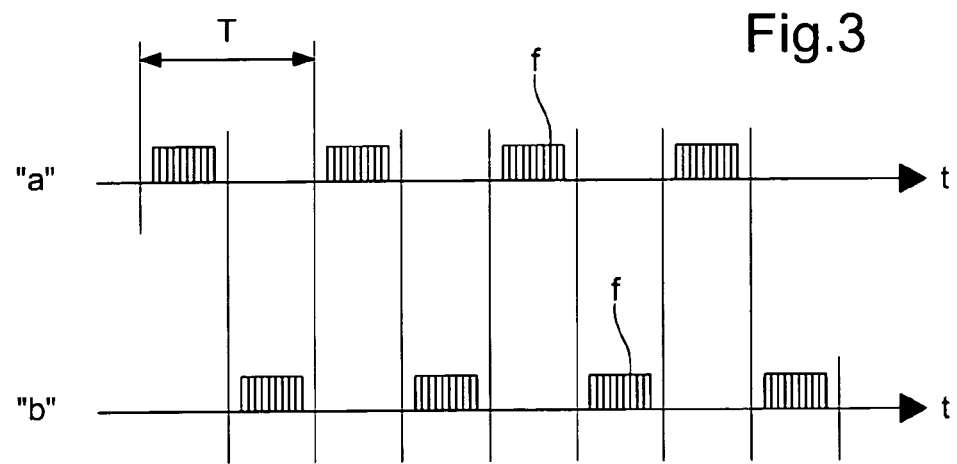
FIG. 3 illustrates a first transmission mode of the first and second electromagnetic signals.

Clock signal CLK could, for example, have a period substantially equal to half the repetition period of the first and second electromagnetic signals, indicated T in FIG. 3, in which case sample-and-hold circuits 45, 46 are arranged to hold their amplitude measurement for a period substantially equal to the period of clock signal CLK.

The signal produced at the output of comparator circuit 47 is delivered to central processing unit 48 for determining the direction of passage of portable electronic unit 40. In overlapping zone AB, it will thus be clear that only the first or second electromagnetic signal is considered for the purpose of determining the direction of passage of portable electronic unit 40. The overlapping zone is essentially divided into two distinct parts respectively associated with the first and second communication regions A, B. The regions where only the first or second electromagnetic signal is received are thus in a way extended by the electronic means of unit 40.

As a result, detection of a reception sequence of signals "a" and "b" will identify with greater security and robustness which of these two signals has been received first and last. According to the invention, by dividing overlapping zone AB thanks to a measurement and comparison of the reception amplitude of the first and second electromagnetic signals, the possibility of detecting the direction of passage of a portable unit associated with the system according to the invention is thereby improved.

For the realisation of comparator circuit 47, a hysteresis comparator circuit, well known to those skilled in the art, will preferably be used, in order to ensure noise tolerance and avoid instability of the output signal of comparator 47 when the portable electronic unit is in a region where the reception amplitudes of the first and second electromagnetic signals are substantially equal.

It will be noted that this variant and exploitation thereof is given by way of nonlimiting example.

Figure 4:
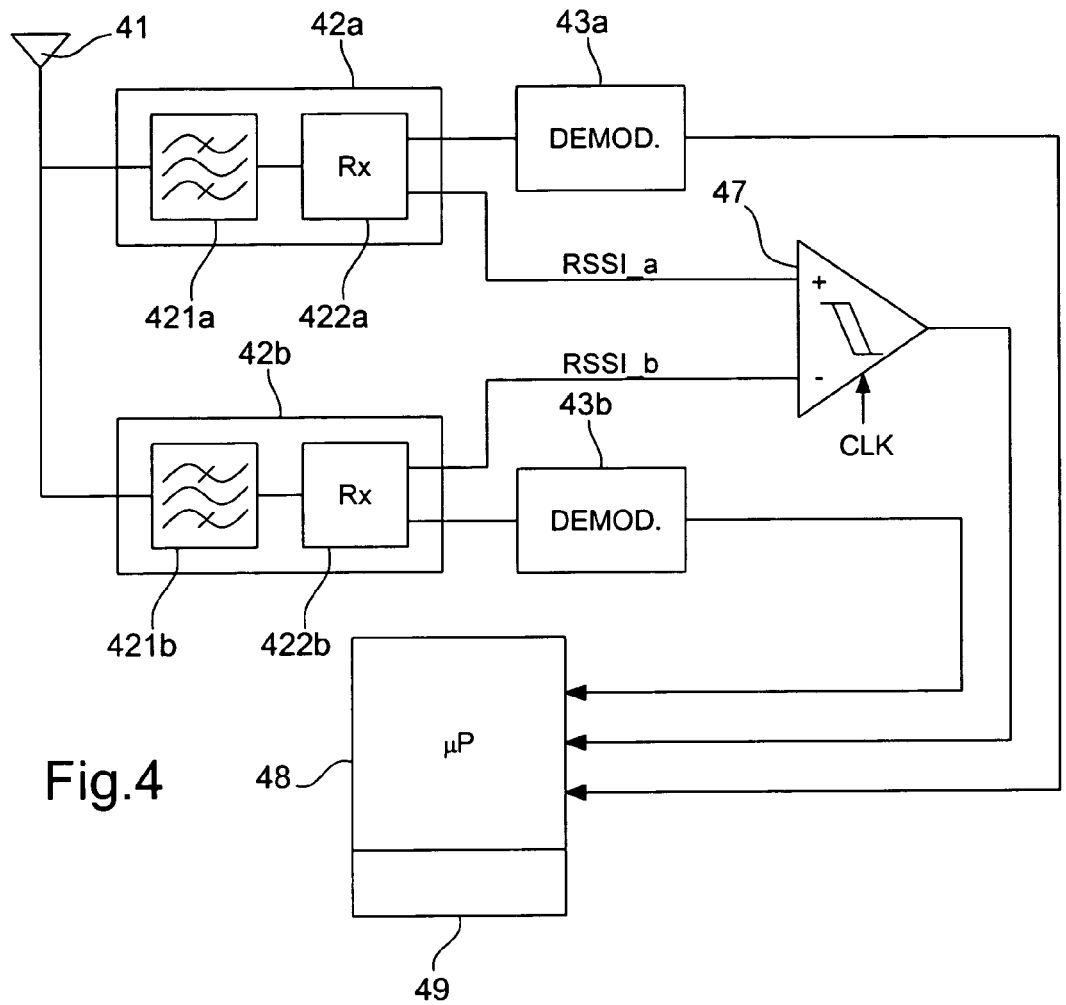
FIG. 4 shows a second variant of a portable electronic unit according to the invention.
Figure 5:
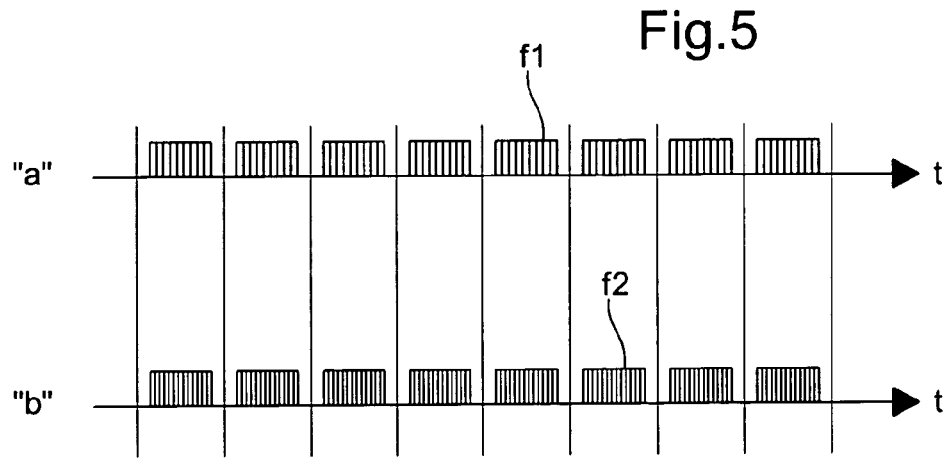
FIG. 5 illustrates a second transmission mode of the first and second electromagnetic signals.

FIG. 4 shows a second variant of a portable electronic unit according to the present invention. According to this second variant, the first and second electromagnetic signals "a" and "b" are transmitted at different frequencies (f1, f2) by antennae 12, 13, as schematically illustrated in FIG. 5. Unlike the first variant, these signals are thus no longer multiplexed over time. In this case, the first and second electromagnetic signals "a" and "b" thus differ in their transmission frequency. This transmission frequency allows dead time to be eliminated between two successive repetitions and thus a larger quantity of data to be transmitted, at a comparable frequency, with respect to the preceding transmission mode using temporal multiplexing. This solution requires, however, the use of two distinct reception channels, one for the first electromagnetic signal "a" and the other for the second electromagnetic signal "b".

As illustrated in FIG. 4, each portable electronic unit thus includes, in this case, first and second reception channels for reception of the first and second electromagnetic signals "a"

and "b", respectively. Electronic unit 40 includes an antenna 41, like previously, connected to first and second reception means 42a and 42b each including the series arrangement of a pass-band filter 421a, respectively 421b, tuned to the transmission frequency of the first electromagnetic signal "a", or respectively of second electromagnetic signal "b", and a receiver circuit 422a, respectively 422b, delivering at its output a reception signal carrying the transmitted data.

Preferably, each receiver circuit 422a, 422b is connected to respective decoding means, indicated by the references 43a and 43b, as previously for extracting the useful data from electromagnetic signals "a" and "b". The decoded data for each signal is transmitted to a central processing unit 48 associated with a memory 49.

Receiver circuits 422a and 422b each deliver a received signal strength indicator RSSI_a and RSSI_b, which is applied to the input of a comparator circuit 47, preferably clocked by a clock signal CLK. This comparator circuit 47 provides at output, as previously, a signal identifying which of the received signals "a" and "b" has the highest amplitude. This signal is delivered to central processing unit 48 for determining the direction of passage of portable electronic unit 40. Again, in overlapping zone AB, only the first or second electromagnetic signal is thus considered in order to establish the direction of passage of portable electronic unit 40.

It will be understood that various modifications and/or improvements obvious to those skilled in the art can be made to the various embodiments described in the present description without departing from the scope of the invention defined by the annexed claims.

What is claimed is:

1. A system for detecting the passage of persons or objects through an entry-exit to a delimited space, including:
   a detection device associated with said delimited space and including transmission means for transmitting different first and second electromagnetic signals in respectively first and second communication regions spatially separated from each other and partially overlapping, these first and second regions each covering an entry-exit zone defined by said entry-exit;
   portable electronic units intended to be fitted to said persons or objects and including reception means for said first and second electromagnetic signals transmitted by said transmission means; and
   detecting means for detecting the direction of passage, through said entry-exit, of a person or an object fitted with one of said portable electronic units as a function of the reception of said first and second electromagnetic signals,
   wherein each portable electronic unit includes:
   amplitude measuring means for determining the reception amplitude, by said portable electronic unit, of said first and second electromagnetic signals; and
   comparator means for comparing the reception amplitude of said first electromagnetic signal with the reception amplitude of said second electromagnetic signal so as to determine which of these two signals has the highest amplitude,
   the signal with the highest amplitude being used by said detecting means to determine the time succession of reception of said first and second electromagnetic signals.

2. The system according to claim 1, wherein said first and second electromagnetic signals are transmitted at the same frequency and are multiplexed over time, said amplitude measuring means further including means for holding the reception amplitude measurement of the first electromagnetic signal, respectively of the second electromagnetic signal, during the amplitude measurement of the second electromagnetic signal, respectively of the first electromagnetic signal.

3. The system according to claim 1, wherein said first and second electromagnetic signals are simultaneously transmitted at different frequencies, each portable electronic unit including first reception means tuned to the transmission frequency of said first electromagnetic signal and second reception means tuned to the transmission frequency of said second electromagnetic signal.

4. The system according to claim 1, wherein said comparator means includes a hysteretic comparator.

5. A portable electronic unit to be fitted to a person or object and to allow detection of the passage of said person or object through an entry-exit to a delimited space, said portable electronic unit including means for receiving first and second electromagnetic signals transmitted respectively in first and second communication regions spatially separated from each other and partially overlapping, these first and second regions each covering an entry-exit zone defined by said entry-exit;
   wherein each portable electronic unit further includes:
   amplitude measuring means for determining the reception amplitude, by said portable electronic unit, of said first and second electromagnetic signals; and
   comparator means for comparing the reception amplitude of said first electromagnetic signal with the reception amplitude of said second electromagnetic signal so as to determine which of these two signals has the highest amplitude,
   the signal with the highest amplitude being provided to means for detecting the direction of passage of said portable electronic unit through said entry-exit in order to determine the time succession of reception of said first and second electromagnetic signals.

6. The electronic unit according to claim 5, wherein said first and second electromagnetic signals are transmitted at the same frequency and are multiplexed over time, said amplitude measuring means further including means for holding the reception amplitude measurement of the first electromagnetic signal, respectively of the second electromagnetic signal, during the amplitude measurement of the second electromagnetic signal, respectively of the first electromagnetic signal.

7. The electronic unit according to claim 5, wherein said first and second electromagnetic signals are simultaneously transmitted at different frequencies, each portable electronic unit including first reception means tuned to the transmission frequency of said first electromagnetic signal and second reception means tuned to the transmission frequency of said second electromagnetic signal.

8. The electronic unit according to claim 5, wherein said comparator means include a hysteretic comparator.

* * * * *